Oct. 4, 1932. R. G. WILLIAMS Re. 18,613

GUY FIXTURE FOR POLES

Original Filed Aug. 12, 1931

Inventor

Rolland G. Williams by J. W. Fowler

Attorney

Reissued Oct. 4, 1932

Re. 18,613

UNITED STATES PATENT OFFICE

ROLLAND G. WILLIAMS, OF BRANFORD, CONNECTICUT, ASSIGNOR TO MALLEABLE IRON FITTINGS COMPANY, OF BRANFORD, CONNECTICUT, A CORPORATION OF CONNECTICUT

GUY FIXTURE FOR POLES

Original No. 1,855,564, dated April 26, 1932, Serial No. 556,703, filed August 12, 1931. Application for reissue filed July 7, 1932. Serial No. 621,294.

This application aims to correct, by a reissue, certain defects in the description and claims of my Patent No. 1,855,564, issued April 26, 1932.

Referring to the accompanying drawings—

Figure 1:
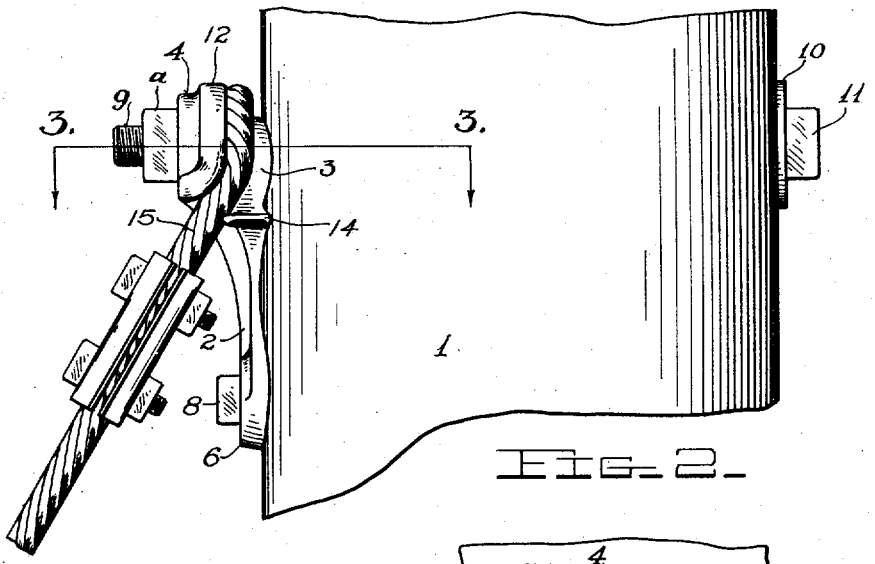
Figure 2:
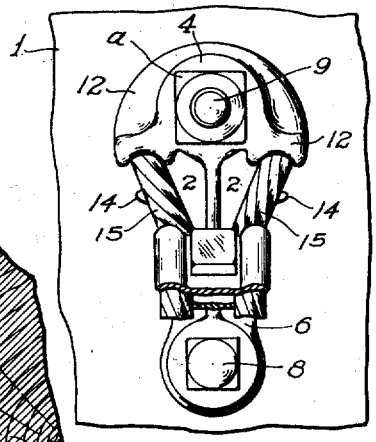
Figure 3:
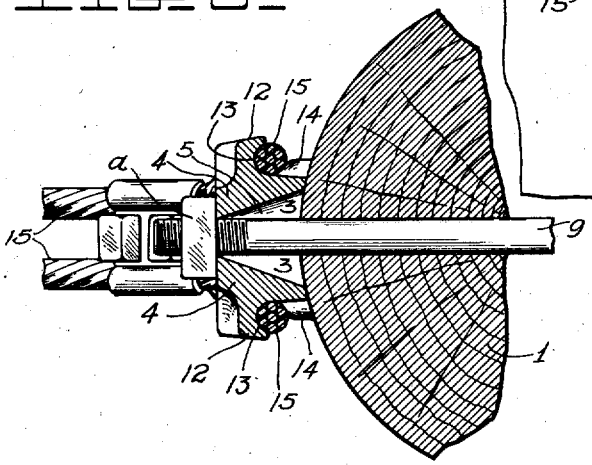

Figures 1 and 2 are elevation views at right angles to each other, showing the fixture secured to the pole with the guy in position, both the pole and the guy being broken away, and Figure 3 is a section at the line 3—3 of Figure 1.

Similar numerals of reference denote like parts in the several figures of the drawing.

1 is the pole and 2 generally denotes the fixture which consists of a comparatively broad base portion 3 shaped to closely conform to the pole, and from this portion a hub 4 extends outwardly and is pierced as shown at 5.

The broad base portion 3 extends downwardly so as to insure a good contact with the pole, and this extension may be pierced and a spike 8 driven therethrough into the pole, if desired.

A bolt 9 is passed through the piercing 5 and through the pole and the end of this bolt is extended beyond the pole and is threaded and a washer 10 and nut 11 applied as usual, and a nut *a* is driven on the front end of the bolt 9 against the fixture 2, whereby the fixture is firmly secured to the pole.

The hub 4 has a rib 12 around its upper and side portions which rib has a groove 13 to accommodate the cable, as will be presently explained, and extending from the sides of the base portion 3 where it merges into the extension 6 are lugs 14 that are in a plane lower than the ends of the rib 12.

These lugs 14 only function when the line of draft of the cable approaches the pole, and such lugs are not at all necessary when the cable diverges considerably away from the pole as is usual in most instances.

The guy cable is denoted by the numeral 15 and is passed around the base 3 and secured in the usual manner.

Any inward draft of the cable is, as above set forth, resisted by the lugs 14 while in the outward draft of the cable away from such lugs the latter will perform no function.

The rib 12 holds the cable so that it cannot slip off the hub.

The spiking of the downward extension 6 to the pole is not necessary particularly in the instances when the fixture is secured to a large pole, a square pole or an iron pole.

In many instances this fixture is secured to a cross arm of the pole by means of the same bolt that is passed through the pole and cross arm, such instances being at the end of a line or where a line of poles turns a corner.

What is claimed is:—

1. The hereindescribed fixture for the attachment of a guy cable to a pole, comprising a base portion having an outwardly extending pierced hub and a downward extension which closely contacts the pole, said hub having a grooved rib extending from its upper and side portions for the attachment of the cable.

2. A guy fixture for a pole comprising a base portion having a pierced hub to accommodate a bolt for securement to the pole and a downward extension which closely conforms to the pole, said hub having an interiorly grooved rib extending along its upper and side portions, and the fixture at the point where said extension merges into said hub having laterally extending lugs whereby when the line of draft of said cable approaches the pole it will contact said lugs.

Signed at Branford in the county of New Haven and State of Connecticut, this 2d day of July, 1932.

ROLLAND G. WILLIAMS.